(12) United States Patent
Matsumoto

(10) Patent No.: US 9,112,399 B2
(45) Date of Patent: *Aug. 18, 2015

(54) MOTOR

(75) Inventor: Naoki Matsumoto, Hamamatsu (JP)

(73) Assignee: Asmo Co., Ltd., Shizuoka-ken (JP)

( * ) Notice: Subject to any disclaimer, the term of this patent is extended or adjusted under 35 U.S.C. 154(b) by 308 days.

This patent is subject to a terminal disclaimer.

(21) Appl. No.: 13/533,400

(22) Filed: Jun. 26, 2012

(65) Prior Publication Data

US 2013/0002070 A1  Jan. 3, 2013

(30) Foreign Application Priority Data

Jun. 30, 2011 (JP) ................................. 2011-146465

(51) Int. Cl.
*H02K 5/22* (2006.01)
*H02K 11/02* (2006.01)

(52) U.S. Cl.
CPC .............. *H02K 11/026* (2013.01); *H02K 5/225* (2013.01)

(58) Field of Classification Search
CPC ......... H02K 5/14; H02K 5/143; H02K 5/145; H02K 5/148; H02K 11/02; H02K 11/022; H02K 11/024; H02K 11/026; H02K 23/66; H02K 5/22; H02K 5/225
See application file for complete search history.

(56) References Cited

U.S. PATENT DOCUMENTS

| | | | |
|---|---|---|---|
| 6,768,243 B1 * | 7/2004 | Yamazaki et al. | 310/239 |
| 8,148,869 B2 | 4/2012 | Kamiya et al. | |
| 2005/0285463 A1 * | 12/2005 | Hockaday et al. | 310/71 |
| 2006/0244321 A1 * | 11/2006 | Mizutani | 310/68 R |
| 2007/0216241 A1 * | 9/2007 | Ortoman et al. | 310/71 |
| 2008/0284272 A1 | 11/2008 | Honda et al. | |
| 2009/0243425 A1 | 10/2009 | Omori et al. | |
| 2010/0283339 A1 * | 11/2010 | Kitai | 310/71 |

FOREIGN PATENT DOCUMENTS

| | | |
|---|---|---|
| JP | 7-194063 | 7/1995 |
| JP | 2009-021184 A | 1/2009 |
| JP | 2009-112095 | 5/2009 |

* cited by examiner

*Primary Examiner* — Quyen Leung
*Assistant Examiner* — Eric Johnson
(74) *Attorney, Agent, or Firm* — Christensen Fonder P.A.

(57) ABSTRACT

A motor includes an armature, a yoke, and an end bracket. The yoke has a bottom and an open end and accommodates the armature. The end bracket substantially closes the open end of the yoke. A connector portion, which bulges outward of the yoke, and a cutout portion are formed in the circumferential wall of the end bracket. A pair of feed members is provided to extend from the interior of the end bracket to the connector portion through the cutout portion. Each feed member has a plurality of connection portions. Each of a pair of terminals of each of a plurality of noise suppression elements is connected to each connection portion. The connection portions are formed in the feed member and arranged in the radial direction.

5 Claims, 4 Drawing Sheets

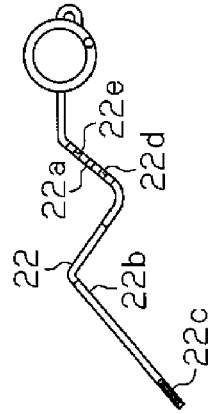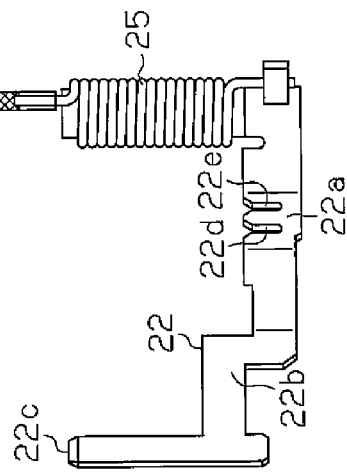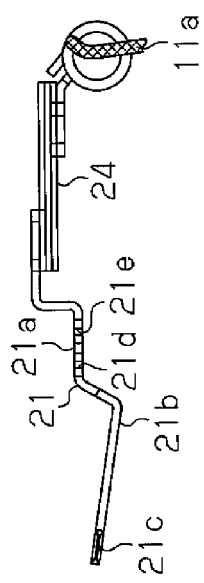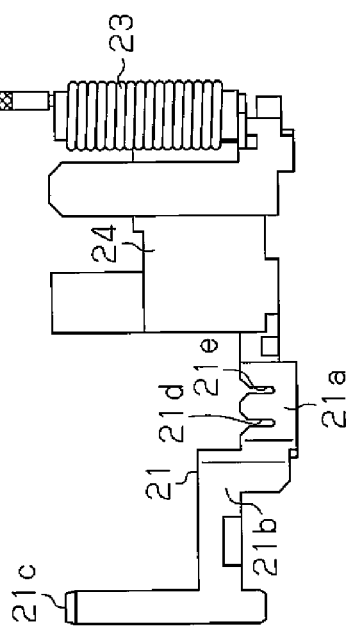
Fig.4A
Fig.4B
Fig.4C
Fig.4D

MOTOR

BACKGROUND OF THE INVENTION

The present invention relates to a motor in which noise suppression elements can be installed.

Conventionally, a type of motor has been known that includes an armature, a substantially cylindrical yoke that has a bottom and an open end and rotationally receives an armature, an end bracket secured to substantially close the open end of the yoke, and noise suppression elements such as capacitors provided in the end bracket. For example, the motor disclosed in Japanese Laid-Open Patent Publication No. 2009-112095 has a connector portion formed on a part of the circumferential wall of the end bracket. The connector portion bulges outward from the yoke when viewed in the axial direction. A cutout portion is formed in a part of the circumferential wall of the end bracket that corresponds to the connector portion. The cutout portion allows the interior of the end bracket to communicate with the connector portion. A pair of feed members extends from the interior of the end bracket to the connector portion through the cutout portion. The feed members have a pair of cutout portion corresponding portions, which correspond to the cutout portion. Noise suppression elements are located between the cutout portion corresponding portions. The terminals of the noise suppression elements are drawn outward in the radial direction and connected to the feed members at the connector portion.

However, in the above described motor, the terminals of the noise suppression elements are drawn outward in the radial direction and connected to the feed members at the connector portion. Therefore, when providing two or more noise suppression elements while avoiding an increase in the size of the connector portion, the terminals of the noise suppression elements need to be elongated to detour other components. In other cases, parts of the connector portion to which the terminals are connected are excessively concentrated.

SUMMARY OF THE INVENTION

Accordingly, it is an objective of the present invention to provide a motor in which the terminals of a plurality of noise suppression elements do not need to be elongated, but can be shortened and easily connected to feed members.

To achieve the foregoing objective and in accordance with one aspect of the present invention, a motor including an armature, a substantially cylindrical yoke having a bottom and an open end, and an end bracket is provided. The yoke rotationally accommodates the armature. The end bracket is fixed to the yoke to substantially close the open end of the yoke. The end bracket has a radial direction and an axial direction. A connector portion is formed in a part of a circumferential wall of the end bracket. The connector portion bulges outward from the yoke as viewed in the axial direction. A cutout portion is formed in a part of the circumferential wall of the end bracket that corresponds to the connector portion. The cutout portion allows the interior of the end bracket to communicate with the connector portion. A pair of feed members is provided to extend from the interior of the end bracket to the connector portion through the cutout portion. Each feed member has a plurality of connection portions. Each of a pair of terminals of each of a plurality of noise suppression elements is connected to each connection portion. The connection portions are formed in the feed member and arranged in the radial direction.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 4A to 4D are explanatory diagrams showing the feed members in the motor of FIG. 1A;

DETAILED DESCRIPTION OF THE PREFERRED EMBODIMENTS

One embodiment of the present invention will now be described with reference to the drawings.

Figure 1A:
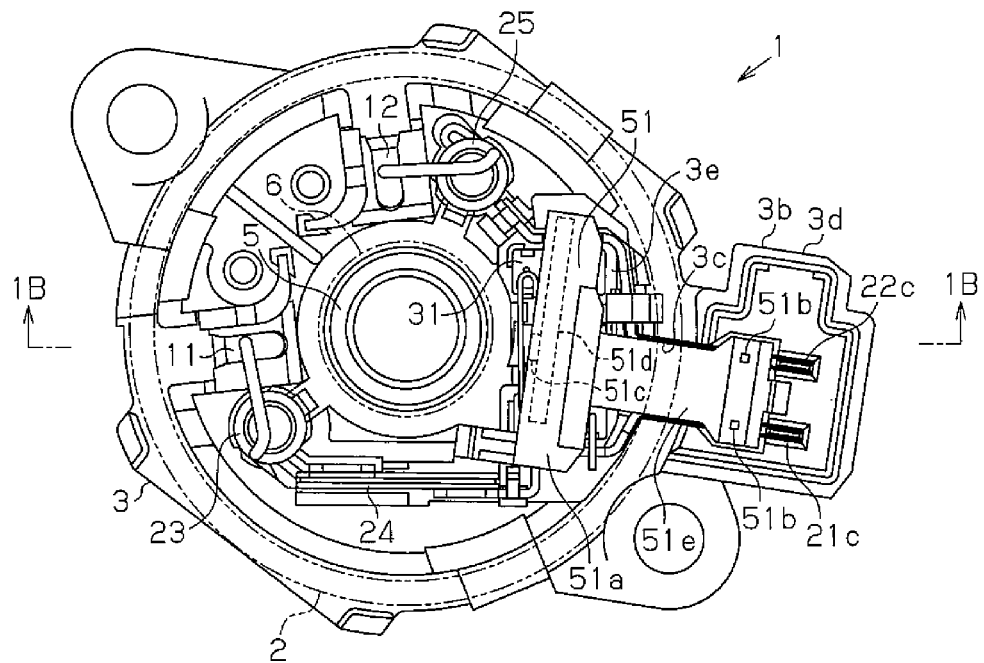
FIG. 1A is a partial plan view illustrating a motor according to one embodiment of the present invention.
Figure 1B:
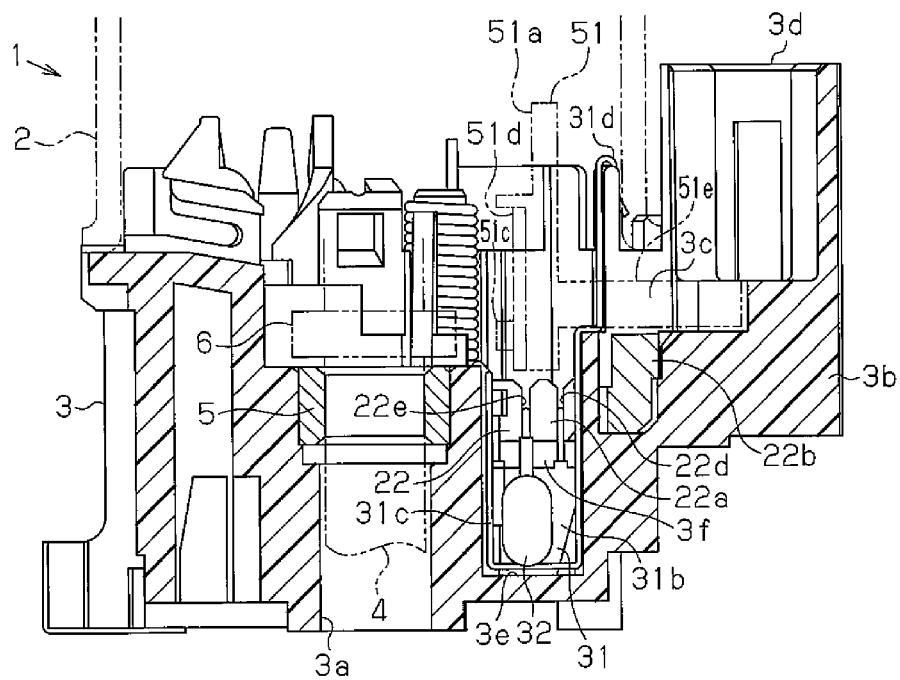
FIG. 1B is a cross-sectional view taken along line 1B-1B in FIG. 1A.

As shown in FIGS. 1A and 1B, a motor 1 includes a substantially cylindrical yoke 2, which has a bottom and an open end, and an end bracket 3, which is fixed to substantially close the open end of the yoke 2. The yoke 2 is made of magnetic metal. Magnets, which are not illustrated, are fixed to the inner circumferential surface of the yoke 2. An armature is accommodated in the yoke 2. A rotary shaft 4 of the armature is rotationally supported by a bearing 5 held at the bottom of the end bracket 3 and an unillustrated bearing, which is held substantially at the center of the bottom of the yoke 2, that is, a center of an end face opposite to the open end. In addition to a core about which coils are wound, a commutator and a sensor magnet 6 (refer to FIG. 1B) are fixed to the rotary shaft 4. As shown in FIG. 1B, the sensor magnet 6 of the present embodiment is fixed to the rotary shaft 4 at a position that is displaced from the bearing 5 in the axial direction and in the vicinity of the bearing 5.

The end bracket 3 is made of plastic and is shaped as a cylinder having a bottom and an open end corresponding to the open end of the yoke 2. A through hole 3a is formed through a center of the bottom of the end bracket 3 in the axial direction to receive the distal end of the rotary shaft 4. The bearing 5 is held at a part of the through hole 3a that is closer to the interior of the yoke 2. The distal end of the rotary shaft 4 is coupled to a coupler portion (not shown) of a load.

A connector portion 3b is integrally formed with a part of the circumferential wall of the end bracket 3. The connector portion 3b bulges outward of the yoke 2 when viewed in the axial direction of the rotary shaft 4, that is, in the axial direction of the end bracket 3. A cutout portion (discontinued part of the circumferential wall) is formed in a part of the circumferential wall of the end bracket 3 that corresponds to the connector portion 3b. The cutout portion allows the interior of the end bracket 3 to communicate with the connector portion 3b. The connector portion 3b has a cylindrical portion 3d. The cylindrical portion 3d extends in the axial direction to receive an external connector of a control device (not shown), which serves as a power source device. In FIG. 1B, the cylindrical portion 3d extends upward along the yoke 2.

Figure 3:
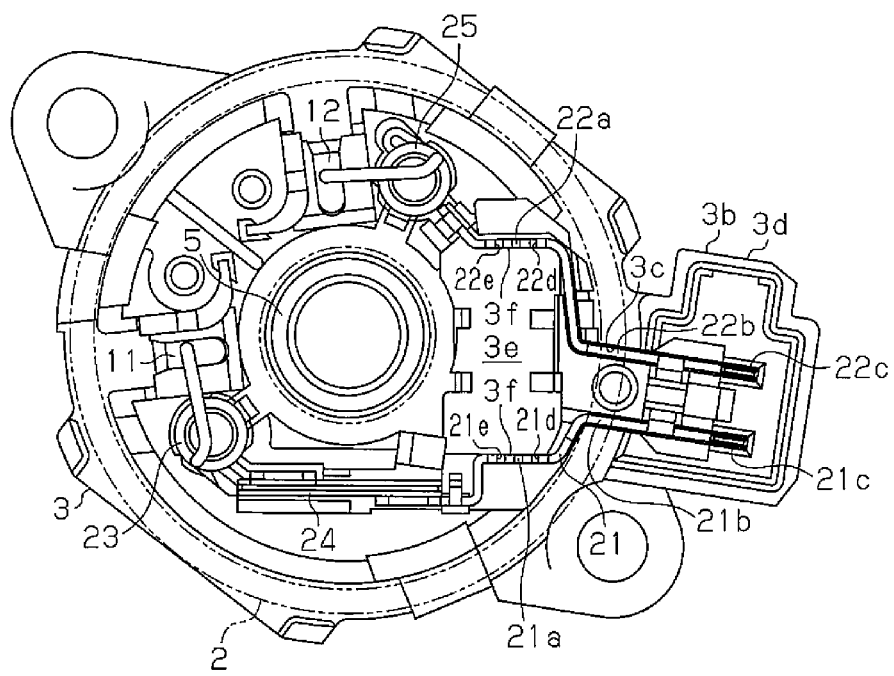
FIG. 3 is a partial plan view for explanatory illustration of the end bracket in the motor of FIG. 1A.

As shown in FIG. 3, the end bracket 3 has an accommodation recess 3e at a position corresponding to the cutout portion 3c. The width of the accommodation recess 3e in a direction perpendicular to the radial direction, that is, in the circumferential direction, is greater than that of the cutout portion 3c. The accommodation recess 3e is formed substantially as a rectangle, which is formed by parallel two sides extending in the radial direction as viewed in the axial direction and another two sides extending in a direction perpendicular to the radial direction to connect the first two sides. The accommodation recess 3e is recessed in the axial direction, or a in a direction away from the viewer of FIG. 3.

Figure 2:
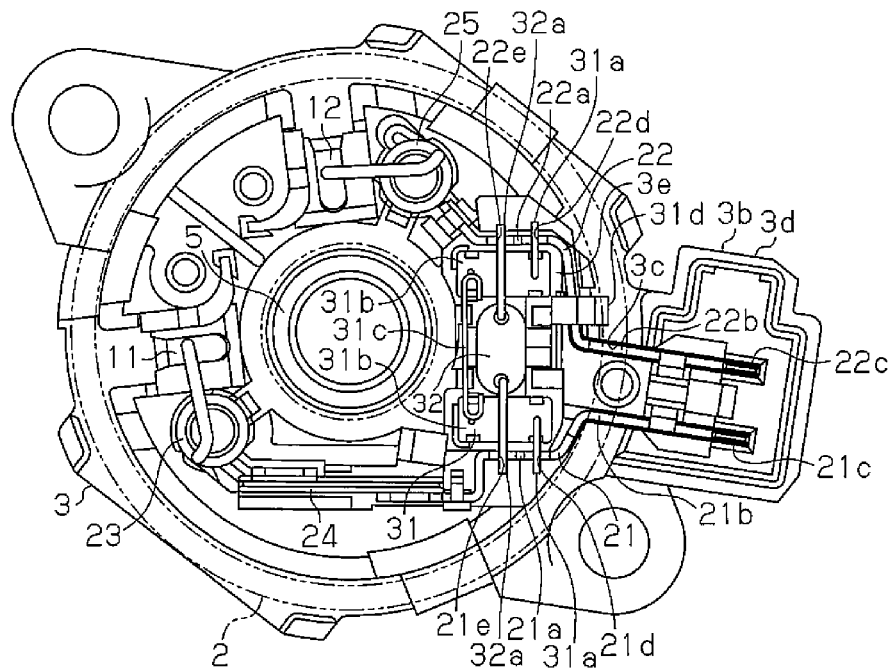
FIG. 2 is a partial plan view showing the motor of FIG. 1A before a rotational speed detecting member is installed.

As shown in FIG. 1A, the end bracket 3 has a pair of feeder brushes, which is located inward of the yoke 2 as viewed in the axial direction and held to be movable in the radial direction. In the present embodiment, the pair of feeder brushes includes first and second feeder brushes 11, 12. The end bracket 3 has an unillustrated torsion coil spring, which urges and presses the feeder brushes 11, 12 radially inward against the commutator. As shown in FIGS. 2 and 3, the end bracket 3 has a pair of feed members, or first and second feed members 21, 22. The first and second feed members 21, 22 are electrically connected to the feeder brushes 11, 12, respectively, and extend, as viewed in the axial direction, from the interior of the yoke 2 to the connector portion 3b (the cylindrical portion 3d) through the cutout portion 3c.

Specifically, a pigtail 11a of the first feeder brush 11 is connected to the first feed member 21 via a choke coil 23 and a plate-like thermistor 24 as shown in FIGS. 4A and 4B. A pigtail 12a of the second feeder brush 12 is connected to the second feed member 22 via a choke coil 25 as shown in FIGS. 4C and 4D. As shown in FIGS. 2 and 3, the feed members 21, 22 has accommodation recess corresponding portions 21a, 22a, which correspond to the accommodation recess 3e, and cutout portion corresponding portions 21b, 22b, which correspond to the cutout portion 3c. The feed members 21, 22 extend to the cylindrical portion 3d of the connector portion 3b. At the distal ends, the feed members 21, 22 have connection terminal portions 21c, 22c extending in the axial direction and along the cylindrical portion 3d. With the feed members 21, 22 installed in the end bracket 3 as shown in FIGS. 2 and 3, the distance between the accommodation recess corresponding portions 21a, 22a is greater than the distance between the cutout portion corresponding portions 21b, 22b. Further, as shown in FIGS. 1B and 3, with the feed members 21, 22 installed in the end bracket 3, the accommodation recess corresponding portions 21a, 22a are flush with inner surfaces 3f of the accommodation recess 3e, which face each other in the width direction. As shown in FIG. 1B, axial ends (lower ends as viewed in FIG. 1B) of the accommodation recess corresponding portions 21a, 22a are arranged to contact in the axial direction opening edge (the upper end as viewed in FIG. 1B) of the accommodation recess 3e of the end bracket 3. The accommodation recess corresponding portions 21a, 22a at least partly overlap with the bearing 5 in the axial direction (see FIG. 1B).

First and second noise suppression elements 31, 32 have a pair of terminals 31a and a pair of terminals 32a, respectively. Connection notches 21d, 21e, 22d, 22e, which serve as connection portions, are formed in the accommodation recess corresponding portions 21a, 22a of the feed members 21, 22. The terminals 31a, 32a of the first and second noise suppression elements 31, 32 are connected to the connection notches 21d, 21e, 22d, 22e. Specifically, the accommodation recess corresponding portions 21a, 22a have the connection notches 21d, 21e, 22d, 22e, each of which receives one of the terminals 31a, 32a of the noise suppression elements 31, 32. The connection notches 21d, 21e, 22d, 22e are arranged in parallel in the radial direction of the feed members 21, 22. The connection notches 21d, 21e, 22d, 22e of the present embodiment have shapes capable of receiving in the axial direction the terminals 31a, 32a of the first and second noise suppression elements 31, 32.

The first noise suppression element 31 of the present embodiment is formed by a pair of combined capacitors 31b. The capacitors 31b are held by a holding member 31c such that the flat surfaces thereof face each other. Each capacitor 31b has first and second terminals. The first terminals are connected to the holding member 31c. The second terminals are drawn in the direction opposite to the facing direction and function as terminals 31a for external connection of the first noise suppression element 31. A ground terminal 31d is formed in the holding member 31c. With the first noise suppression element 31 installed in the end bracket 3, the ground terminal 31d is tightly held between the end bracket 3 and the yoke 2. The second noise suppression element 32 of the present embodiment is formed by a single varistor. The main body of the second noise suppression element 32 except for the terminals 32a can be arranged between the flat surfaces the capacitors 31b.

Each of the connection notches 21d, 21e, 22d, 22e has a width (in the radial direction) that corresponds to the size of the corresponding one of the terminals 31a, 32a of the noise suppression elements 31, 32. Also, the widths of the connection notches 21d, 21e, 22d, 22e are determined to allow the terminals 31a, 32a to be press fitted in the connection notches 21d, 21e, 22d, 22e. The connection notches 21d, 21e, 22d, 22e are formed in the feed members 21, 22 to extend in the axial direction, and open in one end in the axial direction of the feed members 21, 22. The width of the opening of each connection notches 21d, 21e, 22d, 22e widens toward the open end. The first and second noise suppression elements 31, 32 are accommodated in the accommodation recess 3e as shown in FIGS. 1B and 2. In this state, the terminals 31a, 32a are press fitted in and supported by the connection notches 21d, 21e, 22d, 22e to be electrically connected to the connection notches 21d, 21e, 22d, 22e.

Figure 5A:
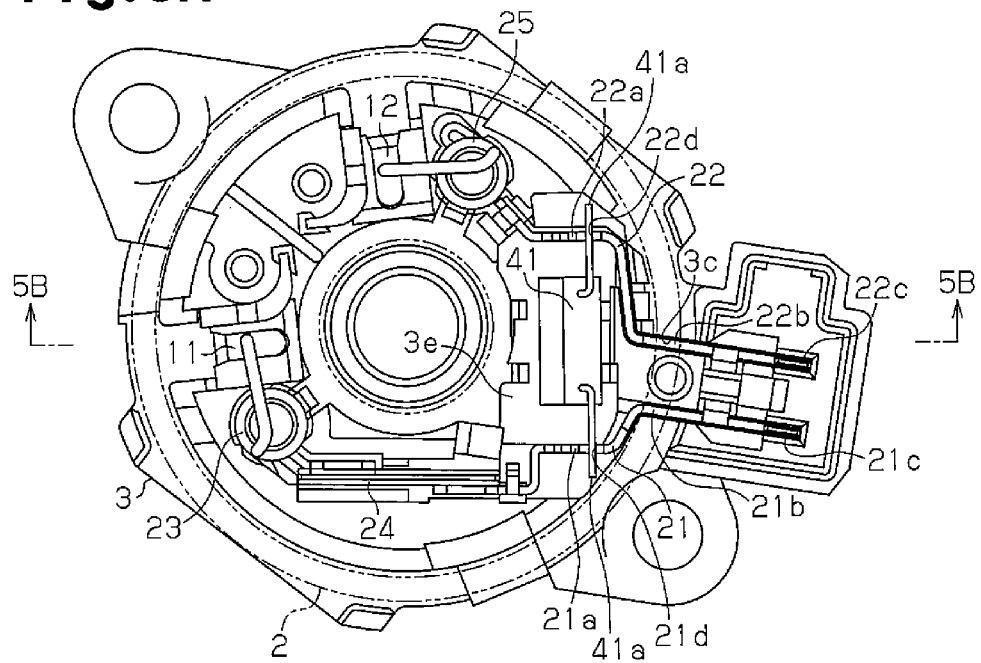
FIG. 5A is a partial plan view illustrating a motor of a different specification.
Figure 5B:
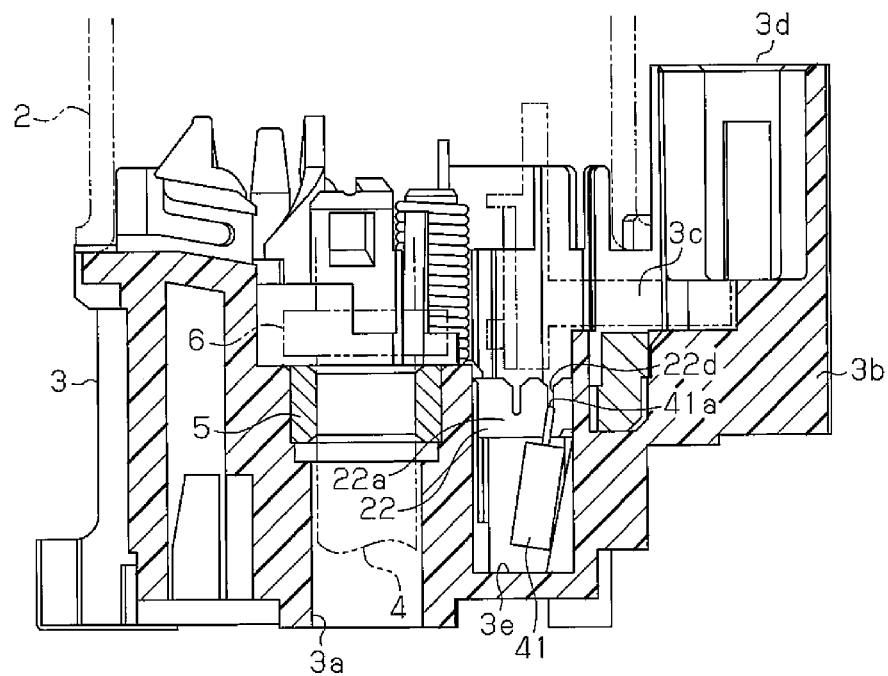
FIG. 5B is a cross-sectional view taken along line 5B-5B in FIG. 5A.

As shown in FIGS. 5A and 5B, the connection notches 21d, 22d of the present embodiment have such shapes to which a terminal 41a of a noise suppression element 41 in a motor having a different specification can be inserted (press-fitted). The noise suppression element 41 is formed by a single capacitor and is suitable for motors having inexpensive specifications without varistors.

As shown in FIGS. 1A and 1B, a rotational speed detecting member 51 is attached to the end bracket 3 at a position facing the sensor magnet 6 in the radial direction. The rotational speed detecting member 51 detects changes in the magnetic force of the sensor magnet 6, that is, the number of rotations of the rotary shaft 4.

Specifically, the rotational speed detecting member 51 includes a plastic base member 51a, a pair of sensor terminals 51b insert molded in the base member 51a, and a Hall IC 51c mounted on a substrate 51d. The substrate 51d is fixed to the base member 51a. As shown in FIG. 1B, the rotational speed detecting member 51 is located at a position displaced in the axial direction from the accommodation recess corresponding portion 22a (21a). As shown in FIG. 1A, the rotational speed detecting member 51 substantially covers the accommodation recess 3e (the first and second noise suppression elements 31, 32) as viewed in the axial direction. The Hall IC 51c (the substrate 51d) is located in a part of the rotational speed detecting member 51 that faces the sensor magnet 6 (the center axis).

The rotational speed detecting member 51 has an extension 51e, which extends to the connector portion 3b through the cutout portion 3c. When the rotational speed detecting member 51 is installed in the end bracket 3, the extension 51e is located at a position displaced in the axial direction from the cutout portion corresponding portions 21b, 22b of the feed members 21, 22 and overlaps the cutout portion corresponding portions 21b, 22b as viewed in the axial direction. The sensor terminals 51b are embedded in the extension 51e. A first end of each sensor terminal 51b is connected to the substrate 51d. A second end of each sensor terminal 51b protrudes in the axial direction together with (parallel with) the connection terminal portions 21c, 22c of the feed members 21, 22 in the cylindrical portion 3d. When an external connector is plugged into the cylindrical portion 3d, the second ends of the sensor terminals 51b are connected to the control device together with the connection terminal portions 21c, 22c.

Operation of the motor 1 will now be described.

When the external control device supplies a drive current to the coils of the armature via the feed members 21, 22, the feeder brushes 11, 12, and the commutator, the armature is rotated. When the sensor magnet 6 rotates together with the rotary shaft 4 of the armature, the accompanying change in the magnetic force is detected by the rotational speed detecting member 51 (the Hall IC 51c), a signal corresponding to the number of rotations of the rotary shaft 4 is output to the control device. Various control processes are executed in accordance with the signal. During the operation, the first and second noise suppression elements 31, 32 connected to the feed members 21, 22 remove noise.

The above described embodiment has the following advantages.

(1) A plurality of parallel connection notches 21d, 21e, 22d, 22e are formed in the radial direction in the accommodation recess corresponding portions 21a, 22a of the feed members 21, 22. The terminals 31a, 32a of the first and second noise suppression elements 31, 32 are connected to the connection notches 21d, 21e, 22d, 22e. Therefore, when the first and second (a plurality of) noise suppression elements 31, 32 are located between the feed members 21, 22, the terminals 31a, 32a of the first and second (a plurality of) noise suppression elements 31, 32 can be easily connected to each other. The terminals 31a, 32a of the first and second noise suppression elements 31, 32 do not need to be extended, but can be shortened.

(2) Since the connection portions are formed by the connection notches 21d, 21e, 22d, 22e, which are capable of receiving in the axial direction the terminals 31a, 32a of the first and second noise suppression elements 31, 32, the first and second (a plurality of) noise suppression elements 31, 32 are easily arranged and connected.

(3) Each of the connection notches 21d, 21e, 22d, 22e has a width that corresponds to the size of the corresponding one of the terminals 31a, 32a of the noise suppression elements 31, 32. Also, the widths of the connection notches 21d, 21e, 22d, 22e are determined to allow the terminals 31a, 32a to be press fitted in the connection notches 21d, 21e, 22d, 22e. Therefore, the first and second noise suppression elements 31, 32 are easily and stably connected, for example, without soldering.

(4) Axial ends (lower ends as viewed in FIG. 1B) of the accommodation recess corresponding portions 21a, 22a of the feed members 21, 22 are arranged to contact in the axial direction opening edge (the upper end as viewed in FIG. 1B) of the accommodation recess 3e of the end bracket 3. That is, the feed members 21, 22 have connection notch forming portions, in which the connection notches 21d, 21e, 22d, 22e are formed, and the connection notch forming portions have first ends, at which the connection notches have openings, and a second end that is opposite to the first end in the axial direction. The second ends contact the end bracket 3 (are supported in the press-fitting direction). Therefore, when the terminals 31a, 32a of the first and second noise suppression elements 31, 32 are press-fitted in the corresponding connection notches 21d, 21e, 22d, 22e, the feed members 21, 22 are prevented from rattling in the axial direction. Thus, the press-fitting can be easily and reliably performed.

(5) Since the width of the opening of the connection notches 21d, 21e, 22d, 22e widens toward the opening end, the first and second noise suppression elements 31, 32 are easily inserted into the corresponding connection notches 21d, 21e, 22d, 22e.

The above described embodiment may be modified as follows.

In the above embodiment, the connection portions are formed by the connection notches 21d, 21e, 22d, 22e, into which the terminals 31a, 32a of the first and second noise suppression elements 31, 32 can be inserted (press fitted) in the axial direction. However, connection portions having different shapes may be used as long as connection terminals, to which terminals are connected, are formed in the radial direction.

In the above described embodiment, the widths of the connection notches 21d, 21e, 22d, 22e are determined such that the terminals 31a, 32a can be press fitted in the corresponding the connection notches 21d, 21e, 22d, 22e. However, the present invention is not limited to this configuration. That is, the width may be determined such that the terminals 31a, 32a can be press fitted into part of the connection notches. For example, the widths of the connection notches may be determined such that the terminals 31a, 32a cannot be press fitted in any of the connection notches. In a case where press fitting cannot be performed, soldering needs to be performed, instead.

In the above illustrated embodiment, the feed members 21, 22 have connection notch forming portions, in which the connection notches 21d, 21e, 22d, 22e are formed, and the connection notch forming portions have a first end, at which the connection notches 21d, 21e, 22d, 22e have openings, and a second end, which is opposite to the first end in the axial direction and contacts the end bracket 3. That is, the second end is supported in the press-fitting direction. However, the present invention is not limited to this. For example, the second end does not need to contact the end bracket 3.

In the above described embodiment, the width of the opening of the connection notches 21d, 21e, 22d, 22e widens toward the open end. However, the width may be constant.

In the above described embodiment, the accommodation recess 3e for accommodating the first and second noise suppression elements 31, 32 is formed at a position in the end bracket 3 that corresponds to the cutout portion 3c, and the connection notches 21d, 21e, 22d, 22e are formed in the accommodation recess corresponding portions 21a, 22a, which correspond to the accommodation recess 3e. However, the position of the connection notches may be changed. For example, noise suppression elements may be located between the cutout portion corresponding portions 21b, 22b, which correspond to the cutout portion 3c of the end bracket 3, and connection notches (connection portions) may be formed in the cutout portion corresponding portions.

In the above described embodiment, the motor 1 has two noise suppression elements (the first and second noise suppression elements 31, 32). However, the number of connection notches (connection portions) may be increased, and three or more noise suppression elements may be provided in a motor.

What is claimed is:

1. A motor comprising:
   an armature;
   a substantially cylindrical yoke having a bottom and an open end, the yoke rotationally accommodating the armature; and
   an end bracket that is fixed to the yoke to substantially close the open end of the yoke, the end bracket extending in a radial direction, a circumferential direction, and an axial direction, wherein
   a connector portion is formed in a part of a circumferential wall of the end bracket, the connector portion bulging outward from the yoke as viewed in the axial direction,
   a cutout portion is formed in a part of the circumferential wall of the end bracket that corresponds to the connector portion, wherein the cutout portion allows the interior of the end bracket to communicate with the connector portion,
   a pair of feed members is provided to extend from the interior of the end bracket to the connector portion through the cutout portion, wherein a pair of terminals of a noise suppression element are operative to be connected to the feed members, respectively,
   the end bracket has an accommodation recess for accommodating the noise suppression element at a position corresponding to the cutout portion, wherein the circumferential width of the accommodation recess is greater than the circumferential width of the cutout portion,
   each feed member has an accommodation recess corresponding portion, which corresponds to the accommodation recess, and a cutout portion corresponding portion, which corresponds to the cutout portion, wherein the cutout portion corresponding portions are arranged within a circumferential range formed by the pair of feeder accommodation recess corresponding portions with respect to the rotor axis, and the distance between the accommodation recess corresponding portions of the feed members is greater than the distance between the cutout portion corresponding portions,
   each feed member of the pair of feed members includes a single arm portion comprising a first distal end, a second distal end, a first bend and a second bend,
   the accommodation recess corresponding portion is arranged on the single arm between the first distal end and the second distal end along the length of the single arm portion,
   each accommodation recess corresponding portion has a connection portion, to which one of the terminals of the noise suppression element is connected,
   each of the feed members extending from the connector portion through the cutout portion to the first bend and extending from the first bend along the circumferential wall to the second bend, and extending from the second bend through the accommodation recess, such that the cutout portion corresponding portions of the feed members are circumferentially offset from the accommodation recess corresponding portions, and
   the connection portions are connection notches into which the terminals of the noise protection elements can be inserted in the axial direction.

2. The motor according to claim 1, wherein each connection notch in each feed member has a width that corresponds to the terminal of the corresponding noise protection element, the width being determined such that the terminal can be press fitted in the connection notch.

3. The motor according to claim 2, wherein each feed member has a connection notch forming portion, in which the connection notches are formed, and the connection notch forming portion has a first end, at which the connection notches have openings, and a second end that is opposite to the first end in the axial direction, and the second end contacts the end bracket.

4. The motor according to claim 1, wherein each connection notch is formed in a corresponding one of the feed members to extend in the axial direction and opens at one end of the corresponding feed member in the axial direction.

5. The motor according to claim 4, wherein the width of the opening of each connection notch increases toward an open end of the opening.

* * * * *